US007639686B2

(12) United States Patent
Wetterwald et al.

(10) Patent No.: US 7,639,686 B2
(45) Date of Patent: Dec. 29, 2009

(54) ACCESS NETWORK CLUSTERHEAD FOR PROVIDING LOCAL MOBILITY MANAGEMENT OF A ROAMING IPV4 NODE

(75) Inventors: Patrick Wetterwald, Mouans Sartoux (FR); Pascal Thubert, La Colle sur Loup (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 583 days.

(21) Appl. No.: 11/100,400

(22) Filed: Apr. 7, 2005

(65) Prior Publication Data

US 2006/0227792 A1    Oct. 12, 2006

(51) Int. Cl.
*H04L 12/28* (2006.01)
*H04L 12/56* (2006.01)
*H04J 3/16* (2006.01)
*H04J 3/22* (2006.01)
*H04J 3/24* (2006.01)
*G06F 15/173* (2006.01)
*G06F 15/16* (2006.01)

(52) U.S. Cl. .................. 370/392; 370/401; 370/410; 370/466; 370/475; 709/225; 709/228; 709/229

(58) Field of Classification Search .................. 370/395
See application file for complete search history.

(56) References Cited

U.S. PATENT DOCUMENTS 5,818,838 A * 10/1998 Backes et al. ............... 370/390

| 6,041,041 | A  | * | 3/2000  | Ramanathan et al. ....... 370/241 |
| 6,393,484 | B1 | * | 5/2002  | Massarani ................... 709/227 |
| 6,587,468 | B1 | * | 7/2003  | Dos Santos et al. ......... 370/401 |
| 6,850,532 | B2 |   | 2/2005  | Thubert et al. |
| 6,912,219 | B2 | * | 6/2005  | Tsuchiya et al. ............ 370/392 |
| 7,277,453 | B2 | * | 10/2007 | Chin et al. ................... 370/466 |
| 2002/0021697 | A1 | * | 2/2002 | Tsuchiya et al. ............ 370/392 |
| 2004/0032852 | A1 |   | 2/2004 | Thubert et al. |

(Continued)

OTHER PUBLICATIONS

IPv6 Address types, http://web.archive.org/web/20050302122543/http://docs.hp.com/en/B3936-90073/apis01.html, Mar. 2, 2005.*

(Continued)

*Primary Examiner*—Daniel J Ryman
*Assistant Examiner*—Nishant B Divecha
(74) *Attorney, Agent, or Firm*—Leon R. Turkevich

(57) ABSTRACT

An IPv4 host is able to maintain connectivity within an access network while moving among access points of the access network, based on receiving a unique assigned IPv4 address from a clusterhead of the access network. Any DHCP request by the IPv4 host is sent via the connecting access point to the clusterhead. The clusterhead, providing connectivity for hosts in the access network to a wide area network based on respective entries, assigns the IPv4 address to the IPv4 host, based on storing an entry including the IPv4 address and an IP-based identifier of the connecting access point, and sends a DHCP response to the IPv4 host via the connecting access point. A second DHCP request from the IPv4 host to a second access point causes the clusterhead to update the entry with the second access point identifier, enabling the IPv4 host to continue use of the assigned IPv4 address.

42 Claims, 7 Drawing Sheets

U.S. PATENT DOCUMENTS

| | | | |
|---|---|---|---|
| 2004/0057440 | A1 | 3/2004 | Thubert et al. |
| 2004/0081152 | A1 | 4/2004 | Thubert et al. |
| 2004/0088385 | A1* | 5/2004 | Blanchet et al. ............ 709/220 |
| 2004/0103212 | A1 | 5/2004 | Takeuchi et al. |
| 2004/0179508 | A1 | 9/2004 | Thubert et al. |
| 2004/0179532 | A1 | 9/2004 | Thubert et al. |
| 2004/0179536 | A1 | 9/2004 | Thubert et al. |
| 2004/0190549 | A1 | 9/2004 | Huitema |
| 2004/0199666 | A1* | 10/2004 | King et al. ................. 709/238 |
| 2004/0233916 | A1 | 11/2004 | Takeuchi et al. |
| 2004/0240468 | A1 | 12/2004 | Chin et al. |
| 2004/0246931 | A1 | 12/2004 | Thubert et al. |
| 2005/0089025 | A1 | 4/2005 | Boyer et al. |
| 2005/0099971 | A1 | 5/2005 | Droms et al. |
| 2005/0117560 | A1 | 6/2005 | Thubert et al. |
| 2005/0286553 | A1 | 12/2005 | Wetterwald et al. |

OTHER PUBLICATIONS

Perkins, "Cluster-Based Networks", *Ad Hoc Networking*, 2001, pp. 75-138, Addison-Wesley.

Droms, "Dynamic Host Configuration Protocol", Network Working Group, Request for Comments: 2131, Mar. 1997.

Perkins, Ed., "IP Mobility Support", Network Working Group, Request for Comments: 2002, Oct. 1996.

Perkins, Ed., "IP Mobility Support for IPv4", Network Working Group, Request for Comments: 3220, Jan. 2002.

* cited by examiner

ACCESS NETWORK CLUSTERHEAD FOR PROVIDING LOCAL MOBILITY MANAGEMENT OF A ROAMING IPV4 NODE

BACKGROUND OF THE INVENTION

1. Field of the Invention

The present invention relates to interoperability between IPv4 nodes and IPv6 networks. In particular, the present invention relates to enabling an IPv4 mobile node to maintain connectivity while moving within an IPv6 access network providing network access to an public IPv4 network via a Network Address Translator (NAT) or a Port Address Translator (PAT).

2. Description of the Related Art

Proposals are underway by the Next Generation Transition (NGTRANS) Working Group of the Internet Engineering Task Force (IETF), renamed as the IPv6 Operations (v6ops) Working Group, to enable network nodes to transmit IP packets, generated according to IPv6 protocol as specified by the Request for Comments (RFC) 2460, across an IPv4 network. In particular, RFC 3056 proposes an interim solution (referred to herein as "the 6to4 proposal") of sending IPv6 packets as payload for IPv4 packets, where an interim unique IPv6 address prefix is assigned to any node that has at least one globally unique IPv4 address. These RFCs are available on the World Wide Web at the IETF website ("www.ietf.org").

The 6to4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address.

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6to4 mechanism" in order for the 6to4 proposal to still be operable in the IPv4 network having the NAT. However, the modification of existing NATs to include IPv6 routers to include the 6to4 mechanism may not be a practical solution.

Further, the IPv4 addresses of the 6to4 protocol are assumed to be global public addresses. Hence, if an IPv6 node (i.e., a correspondent node) wants to communicate with a roaming mobile IPv6 node, the 6to4 address of the roaming mobile IPv6 node must be a global public address, not a private address.

Another NAT-based proposal for enabling IPv4 hosts in an IPv4 network to access IPv6 hosts in an IPv6 network is described in RFC 2766, entitled "Network Address Translation—Protocol Translation (NAT-PT). The NAT-PT provides a combination of network address translation and protocol translation based on a pool of IPv4 addresses for assignment to IPv6 nodes on a dynamic basis as sessions are initiated across IPv4-IPv6 boundaries. However, the description of the NAT-PT in the RFC 2766 assumes that IPv4 addresses are unique.

Commonly-assigned, copending application No. 10/875,811, filed Jun. 25, 2004, entitled "ARRANGEMENT FOR REACHING IPv4 PUBLIC NETWORK NODES BY A NODE IN AN IPv4 PRIVATE NETWORK VIA AN IPv6 ACCESS NETWORK," the disclosure of which is incorporated in its entirety herein by reference, describes an arrangement that enables an IPv4 node to access an IPv4 public network via an IPv6 access network. The IPv4 node is able to send an IPv4 packet to an IPv4 destination via the IPv6 access network, based on translation of the IPv4 packet into an IPv6 packet for transmission via the IPv6 access network. The IPv4 packet is translated into the IPv6 packet by a local gateway. The IPv6 packet has an IPv6 source address that includes a prescribed address prefix assigned to the local gateway, and an IPv4 address of the LPv4 node. The IPv6 packet also includes an IPv6 destination address that includes a second address prefix assigned to a remote gateway, and a second IPv4 address of the IPv4 destination. The IPv6 packet is converted by the remote gateway into an IPv4 packet for reception by the IPv4 destination via an IPv4 network. Hence, the IPv4 node is able to communicate with an IPv4 destination residing on another IPv4 network via the IPv6 access network, without the necessity of generating an IPv6 tunnel between the local gateway and the remote gateway.

A Mobile IPv4 protocol has been suggested as a solution to enable an mobile node to maintain connectivity in a mobile network. In particular, the RFC 2002, entitled "IP Mobility Support," proposes that a mobile node is configured to maintain a home address, and a "care-of address": the mobile node is always identified by its home address, regardless of its current point of attachment. While away from its home network, the mobile node uses its care-of address, having a value based on its current point of attachment to the network. The mobile node sends a binding update to its home agent at the home network that indicates that the home address is reachable via the care-of address. The home agent sends datagrams destined for the mobile node through a tunnel to the care-of address. After arriving at the end of the tunnel, each datagram is then delivered to the mobile node.

The requirement of the above-described Mobile IPv4 protocol, however, imposes substantial processing requirements for an IPv4 host. In addition to requiring an IPv4 host to be modified to implement the Mobile IPv4 protocol, the Mobile IPv4 protocol imposes additional constraints such as requiring the IPv4 host to obtain a new care-of address for each new point of attachment, perform a new binding update with the home agent for each new point of attachment, and establish a tunnel between the mobile IPv4 host and its home agent. Such requirements increase the convergence time in establishing connectivity, causing an increased risk of loss of connectivity while a mobile node traverses across multiple access points within a limited area (e.g., a building, campus, a city district, town, etc.).

SUMMARY OF THE INVENTION

There is a need for an arrangement that enables an IPv4 host to establish and maintain IP connectivity from among multiple access points within an access network. In particular, there is a need for an arranement for the IPv4 host to maintain IP connectivity with the access network while moving from one access point to a second access point, without the necessity of obtaining a new care-of address or performing a binding update based on connecting with a new access point within the clustered network.

There also is a need for an arrangement that enables an IPv4 host to establish and maintain IP connectivity within an access network, while moving from one access point to a second access point of the access network, in a manner that is transparent to any node outside of the access network.

These and other needs are attained by the present invention, where an IPv4 host is able to maintain connectivity within an access network while moving among access points of the access network, based on receiving a unique assigned IPv4 address from a clusterhead of the access network. Any DHCP request by the IPv4 host is sent via the connecting access point to the clusterhead. The clusterhead, providing connectivity for hosts in the access network to a wide area network based on respective entries, assigns the IPv4 address to the IPv4 host, based on storing an entry including the IPv4 address and an IP-based identifier of the connecting access point, and sends a DHCP response to the IPv4 host via the connecting access point. A second DHCP request from the IPv4 host to a second access point causes the clusterhead to update the entry with the second access point identifier, enabling the IPv4 host to continue use of the assigned IPv4 address.

Hence, an IPv4 host can continue using an assigned DHCP address as it moves throughout the access network in a manner that is transparent to nodes outside the access network. Moreover, layer 3 (i.e., IP-based) roaming can be implemented without the necessity of Mobile IP protocol, enabling latency-sensitive data streams (e.g., Voice over IP) to be automatically transferred to a new access point as the IPv4 host moves throughout the access network.

One aspect of the present invention provides a method in a clusterhead of an access network. The method includes receiving from an IPv4 host, via an access point within the access network, a Dynamic Host Configuration Protocol (DHCP) request for assignment of an IPv4 address. The DHCP request includes an IP-based identifier that uniquely identifies the access point having forwarded the DHCP request. The method also includes responding by the clusterhead to the DHCP request by assigning to the IPv4 host an IPv4 address that is unique within the access network. The assignment of the IPv4 address includes creating a table entry specifying the IPv4 address is reachable via the IP-based identifier of the access point, and sending a DHCP response to the access point that specifies the IPv4 address for use by the IPv4 host. The method also includes providing connectivity by the clusterhead for any hosts within the access network, including the IPv4 host. Providing connectivity includes: (1) receiving from the IPv4 wide area network an IPv4 packet having a destination address assigned to the IPv4 host, (2) identifying, based on accessing the corresponding table entry, that the IPv4 host is reachable at the IPv4 address via the IP-based identifier specified in the table entry, and (3) sending the packet to the access point having the corresponding IP-based identifier specified in the table entry having been accessed, for delivery to the IPv4 host assigned the IPv4 address.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
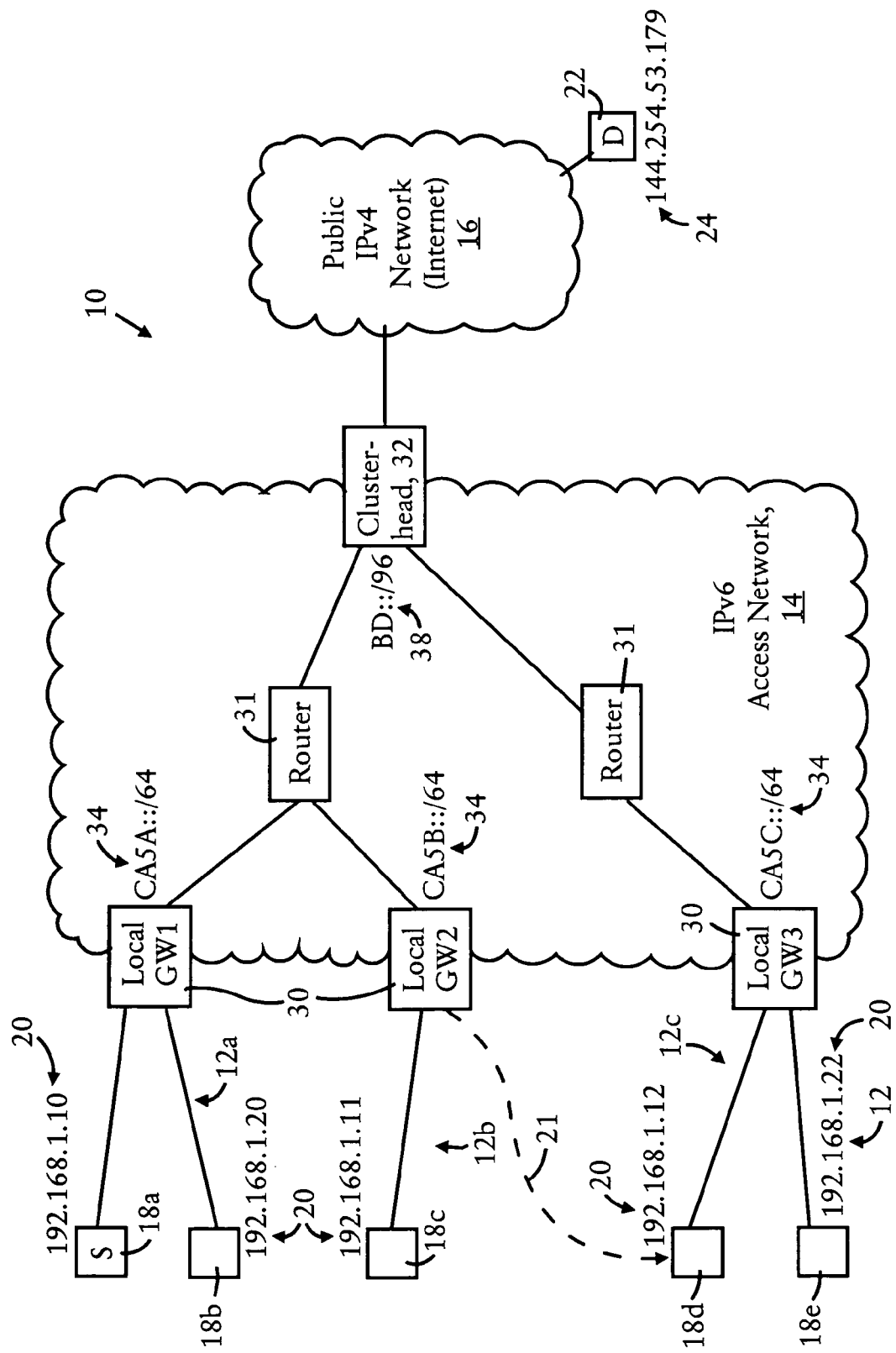
FIG. 1 is a diagram illustrating an internetworking system including an IPv6 access network having multiple access points connecting IPv4 hosts, and a clusterhead connecting hosts in the access network to a wide area IPv4 network such as the Internet, according to an embodiment of the present invention.

FIG. 1 is a diagram illustrating an internetworking system 10 including an IPv6 access network 14, according to an embodiment of the present invention. The IPv6 access network includes access points (also referred to as local gateways) 30 providing wireless access cells 12 (e.g., 12a, 12b, 12c) geographically dispersed throughout a customer premises (e.g., a building, etc.), and a clusterhead (also referred to as a remote gateway) 32 providing connectivity for IPv4 host devices 18 (e.g., 18a, 18b, 18c, 18d, 18e) accessing the access points 30 to reach a public IPv4 network 16. Each access point 30 is configured for generating a corresponding wireless access cell 12, for example an IEEE 802.11 based wireless cell having Extended Service Set (ESS) capabilities, enabling a host device 18 to obtain connectivity with the IPv6 access network 14. Although not shown in FIG. 1, it will be readily apparent that other IPv6 network nodes may be deployed within the network, for example wired access points, domain name system (DNS) servers, etc.

The access points 30 and the routers 31 interconnecting the access points 30 are arranged in a cluster (i.e., a tree-based topology having no loops), where cluster includes a single root 32, referred to herein as the "clusterhead". As apparent from FIG. 1, the clusterhead 32 is the single access point for transfer of packets between the IPv6 access network 14 and the public IPv4 network 16. Hence, the clusterhead 32 can be considered the access router for the IPv6 access network 14 reaching the public IPv4 network 16. It will also be readily apparent that the access network 14 can be a mobile IPv6 network. Note that the IPv4 and IPv6 addressing disclosed herein is in accordance with RFC 1918, and RFC 3513, entitled "Internet Protocol Version 6 (IPv6) Addressing Architecture."

As described below with respect to FIG. 2, the clusterhead 32 includes a DHCP server configured for assigning to each IPv4 host 18 a corresponding unique IPv4 address, in accordance with RFC 2131, for use by the corresponding IPv4 host 18 while connected to the access network 14. In particular, each IPv4 host 18 is assigned a corresponding unique IPv4 address by the clusterhead 32: the assigned IPv4 address may be a public IPv4 address, for example within an address space assigned to the clusterhead 32 by an authoritative source, such as the IANA, or the assigned IPv4 address may be a private address as specified by the RFC 1918, entitled "Address Allocation for Private Internets". The public IPv4 network 16 is "public" in that each network node 22 must use a valid, globally-unique IPv4 address 24 (e.g., "144.254.53.179"), as described in the RFC 1918. An example of the public IPv4 network 16 is the Internet.

The disclosed embodiment enables the IPv4 host devices 18 to maintain connectivity with the public network 16 while roaming throughout the access network 14, based on using the same assigned IPv4 address 20 within the access network 14. In particular, each IPv4 host 18 connects to at least one access point 30, using the prescribed layer 2 (link layer) protocols (e.g., IEEE 802.11). Each access point 30 (e.g., GW1, GW2, GW3) interfaces with the IPv6 access network 14 using a corresponding assigned IPv6 address prefix 34 (e.g., a 64-bit address prefix having a hexadecimal value of "CA5A::/64", "CA5B::/64", "CA5C::/64") that uniquely identifies the access point 30 within the IPv6 access network 14.

Since the clusterhead 32 is configured for providing DHCP services, all DHCP requests that are initiated by any one of the IPv4 hosts 18 are forwarded by the access points 30 to the clusterhead 32 for assignment. The clusterhead 32, in response to receiving a DHCP request, assigns to the IPv4 host 18 a corresponding IPv4 address 20 that is unique within the access network 14, and creates internally a table entry specifying that the IPv4 address 20 is reachable via the IP-based identifier 34 assigned to the access point 30 having forwarded the DHCP request. For example, the IPv4 host 18a would send its DHCP request to the access point 30 "GW1" having the assigned IPv6 address prefix "CA5A::/64": the access point 30 would encapsulate the DHCP request in an IPv6 packet having an IPv6 source address with the prefix "CA5A::/64". The clusterhead 32 could then create a table entry that specifies that the IPv4 address "192.168.1.10" assigned to the IPv4 host 18a is reachable via the address prefix "CA5A::/64". Further, any IPv6 packet destined for the IPv4 host 18a will specify the address "CA5A:: 192.168.1.10", enabling any router 31 in the access network 14 to send packets to the attachment point 30 having the assigned prefix 34.

As described below, if any one of the IPv4 hosts 18 (e.g., 18d) moves from one access point (e.g., GW2 having prefix "CA5B::/64") 30 to another access point (e.g., GW3 having prefix "CA5C::/64"), as illustrated by the dotted line 21, the IPv4 host 18d responds to the establishment of a new connection with the new access point 30 by sending a second DHCP request requesting renewal of the assigned IPv4 address ("192.168.1.12") 20. The new access point (e.g., having prefix "CA5C::/64") sends a DHCP renewal request to the clusterhead 32, where the clusterhead 32 can update the corresponding entry indicating that the assigned IPv4 address ("192.168.1.12") 20 is no longer reachable via the prefix address "CA5B::/64" 34 of the access point "GW2" 30, but is now reachable via the prefix address "CA5C::/64" 34 of the access point "GW2" 30.

Hence, IPv6 based mobility is provided for the IPv4 hosts 18, without the necessity of any mobile IP protocols by the IPv4 hosts 18; rather, the access network 14 appears to the IPv4 hosts 18 as a bridged local area network having multiple wireless access points for connection to the same wireless link. However, the IPv6 access network 14 actually provides full IPv6 routing capabilities to each of the IPv4 hosts 18, enabling advanced mobile IPv6 operations to be performed, for example Voice over IP, etc.

Figure 2:
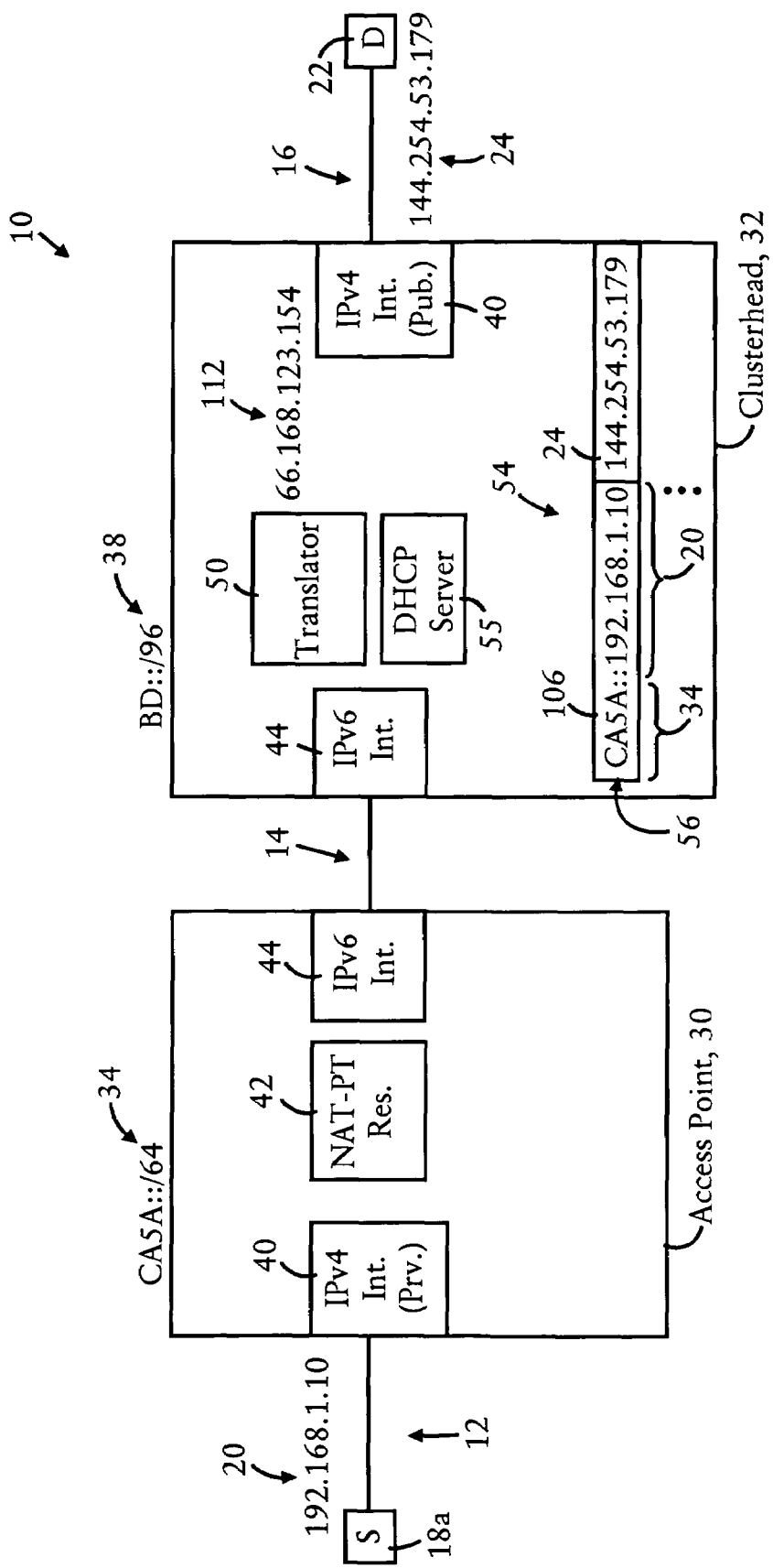
FIG. 2 is a diagram illustrating in further detail one of the access points and the clusterhead of FIG. 1, used to provide access to the public IPv4 network by a node in the access network, according to an embodiment of the present invention.

FIG. 2 is a diagram illustrating in further detail one of the access points 30 and the clusterhead 32 of FIG. 1, according to an embodiment of the present invention. The access point 30 includes an IPv4 interface 40 configured for sending and receiving IPv4 packets using private addresses, a NAT-PT based translation resource 42 configured for translating between IPv4 packets and IPv6 packets, and an IPv6 interface 44 for sending and receiving IPv6 packets onto and from the IPv6 access network. A discovery resource (not shown) may be used to enable the access point 30 to dynamically receive the assigned IPv6 address prefix 34. An example of an access point 30 is a comercially-available Linksys® router from Cisco Systems, Inc., available on the World Wide Web at the domain name "linksys.com", that has been modified as described herein to support IPv6.

Figure 4A:
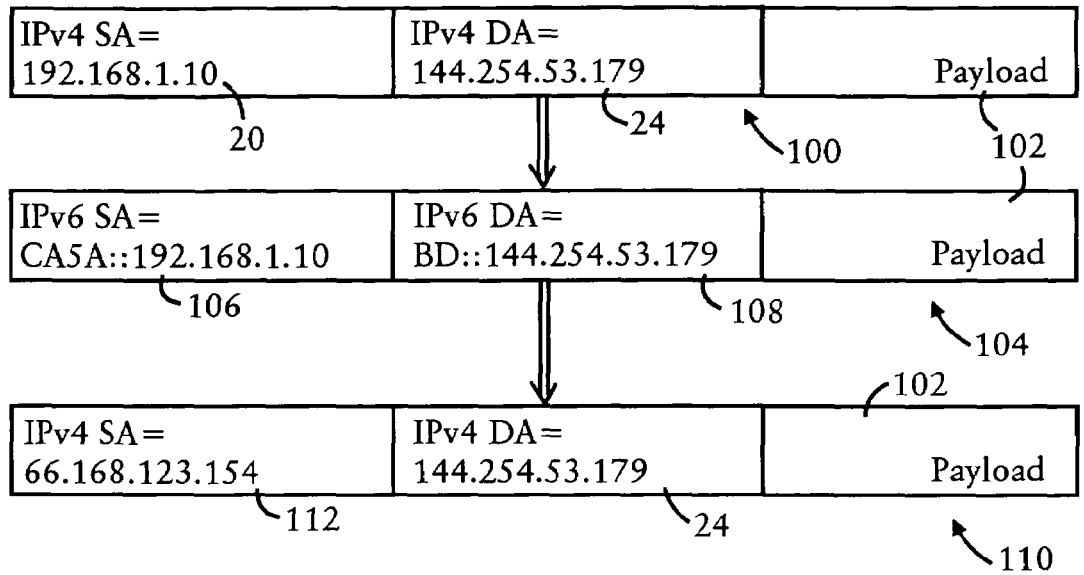
FIGS. 4A and 4B are diagrams illustrating translation of respective request and response packets, by the access point and the clusterhead, according to an embodiment of the present invention.

The NAT-PT translation resource 42 is configured for translating between IPv4 addresses for the IPv4 host 18a and IPv6 addresses for transfer on the IPv6 access network 14. As illustrated in FIG. 4A, the NAT-PT translation resource 42 is configured for translating each received IPv4 packet (including DHCP discover messages or DHCP request messages as specified in RFC 2131) 100 into an IPv6 packet 104. As illustrated in FIG. 4A, the IPv4 packet 100 includes a private IPv4 source address (which may be temporary address pending resolution of any DHCP request) 20, a public IPv4 destination address 24, and an IPv4 payload (including TCP/UDP header information), and the IPv6 packet 104 includes an IPv6 source address 106 and an IPv6 destination address 108.

The IPv6 source address 106 generated by the access point 30 includes the assigned IPv6 address prefix 34 for the corresponding access point 30. The assigned IPv6 address prefix 34 for the corresponding access point 30 may be assigned to the access point 30 either statically (e.g., based on programming of a nonvolatile register), or preferably dynamically, for example by an access router in the IPv6 access network 14 (not shown) using Dynamic Host Configuration Protocol (DHCPv6) according to RFC 3633.

Figure 5:
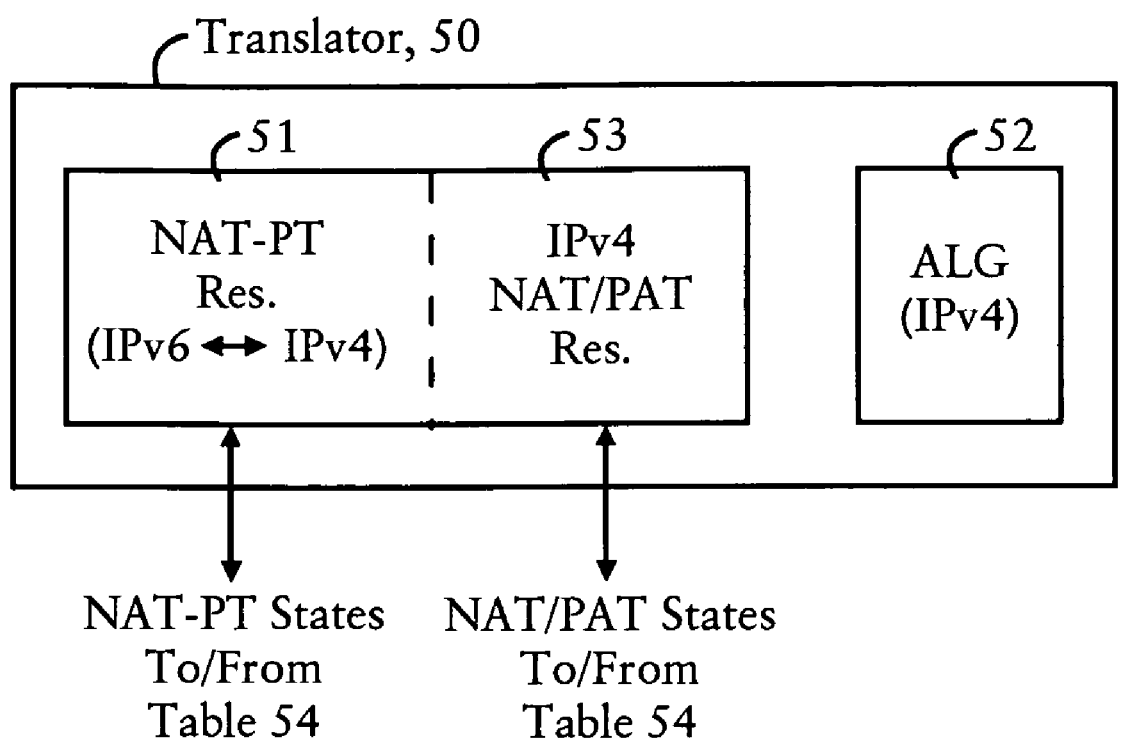
FIG. 5 is a diagram illustrating in detail the translator of the clusterhead of FIG. 2, according to an embodiment of the present invention.

The clusterhead 32 includes an IPv6 interface 44, a translator resource 50, a DHCP server 55 in accordance with RFC 2131, an IPv4 interface 40 configured for sending and receiving IPv4 packets onto the public IPv4 network 16 using public addresses, and a NAT table 54. As described below with respect to FIG. 5, the translator resource 50 includes a NAT-PT resource 51 for IPv6-to-IPv4 translations and vice versa, a NAT/PAT resource 53 for performing IPv4 address translations between private and public IPv4 addresses (and PAT-based port translations for address reuse), and an application level gateway resource 52.

The clusterhead 32 has a corresponding assigned IPv6 address prefix ("BD::/96") 38 used for translation between IPv6 and IPv4 addresses by the NAT-PT resource 51, described below. As illustrated in FIG. 4A, the translator 50 is configured for translating the received IPv6 packet 104 into a new IPv4 packet 110 that includes a public IPv4 source address 112 and a public IPv4 destination address 24, enabling the transfer of the new IPv4 packet 110 (with the original payload 102 output by the local IPv4 node ("S") 18) to the intended destination node 22 via the public IPv4 network 16.

Figure 4B:
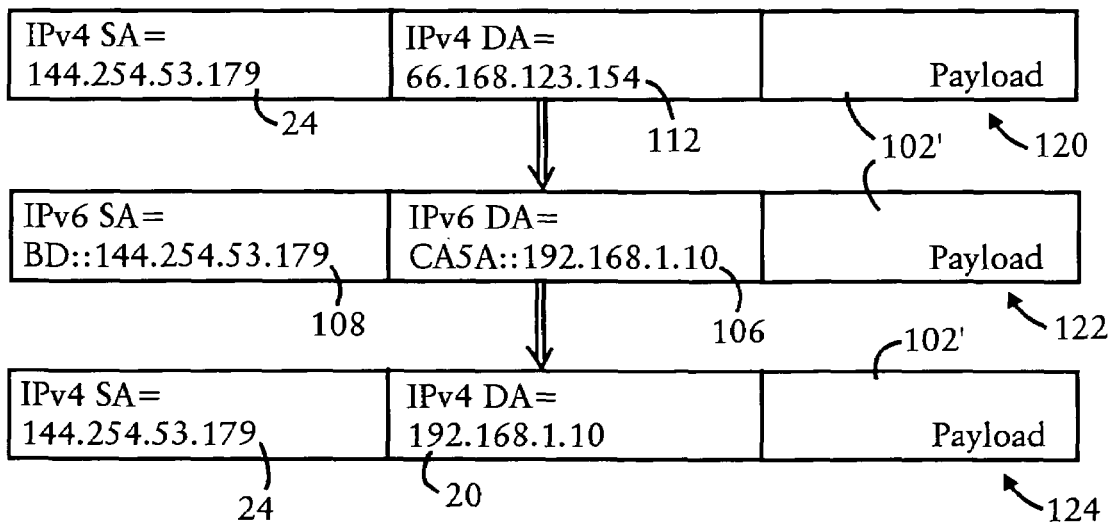

As shown in FIG. 4B, the translator 50 enables the clusterhead 32 to translate an IPv4 response packet 120, having been received from the public node 22 in the public IPv4 network 16, into an IPv6 packet 122 having a destination address 106 destined for the access point 30. The access point 30 is configured for translating the IPv6 packet 122 into an IPv4 packet 124 for delivery to the originating private IPv4 host 18.

The IPv4 NAT/PAT translation resource 53 is configured for translating between private and public IPv4 addresses as known in the art, for example as described in RFC 1918. In addition, the translation resource 53 includes PAT functionality that enables the clusterhead 32 to reuse an assigned public address 112 for multiple connections on the IPv4 network 16. In particular, if the source IPv4 node ("S") 18 outputs a packet 100 having an originally-specified TCP/UDP port value (e.g., "80") specified in the payload (e.g., in the TCP/UDP source port field), the PAT functionality in the IPv4 NAT/PAT translation resource 53 will translate the originally-specified TCP/UDP port value in the TCP/UDP source port field to a translated TCP/UDP port value (e.g., "1") to serve as a 16-bit reference for identifying the data flow, and add an NAT/PAT table entry (e.g., within the table 54) that specifies not only the translated IPv4 private and public addresses (e.g., "192.168.1.10" and "66.168.123.154"), but also the originally-specified and translated TCP/UDP port values (e.g., "80" and "1"). Hence, the PAT functionality enables the remote gateway to use the same IPv4 public address for $2^{16}$ distinct connections.

The translation resource 53 also includes reverse PAT functionality, enabling the translation resource 53 to determine that a reply packet 120 is destined for the original source node ("S") based on the matching the stored table entry pair of the destination address 112 and the destination TCP/UDP port (e.g., "1") in the payload 102': in this case, the reverse PAT functionality translates the destination TCP/UDP port field from the translated TCP/UDP port value (e.g., "1") to the originally-specified TCP/UDP port value (e.g., "80"). A reverse NAT functionality in the translation resource 53 also enables a packet from the IPv4 network 16 to reach the appropriate private node 18 based on proactive information (e.g., manual or remote configuration) enabling the translation resource 53 to associate the packet with the private node 18.

The NAT-PT translation resource 51 stores IPv6-to-IPv4 translation states in the NAT table 54 in the form of entries 56. Hence, the table entries 56 enable the translator 50 to translate between the IPv6 address of an IPv4 host 18 and the assigned public IPv4 address 24 for use on the public network 16.

The ALG resource 52 is associated with the IPv4 NAT/PAT functionality executed by the translation resource 53, and as such is part of the part of the IPv4 based translation operations (alternately, the ALG 52 could be implemented as part of the translation resource 53). Since certain applications carry network addresses in the payloads, if the ALG resource 52 detects a network address within the payload 102 or 102', the ALG resource 52 converts the network address within the payload as needed (e.g., from "192.168.1.10" of packet 104 to "66.168.123.154" for packet 110; from "66.88.123.154" of packet 120 to "192.168.1.10" for packet 122), based on the associated NAT state, to enable execution of the application at the private node 18.

Figure 3A:
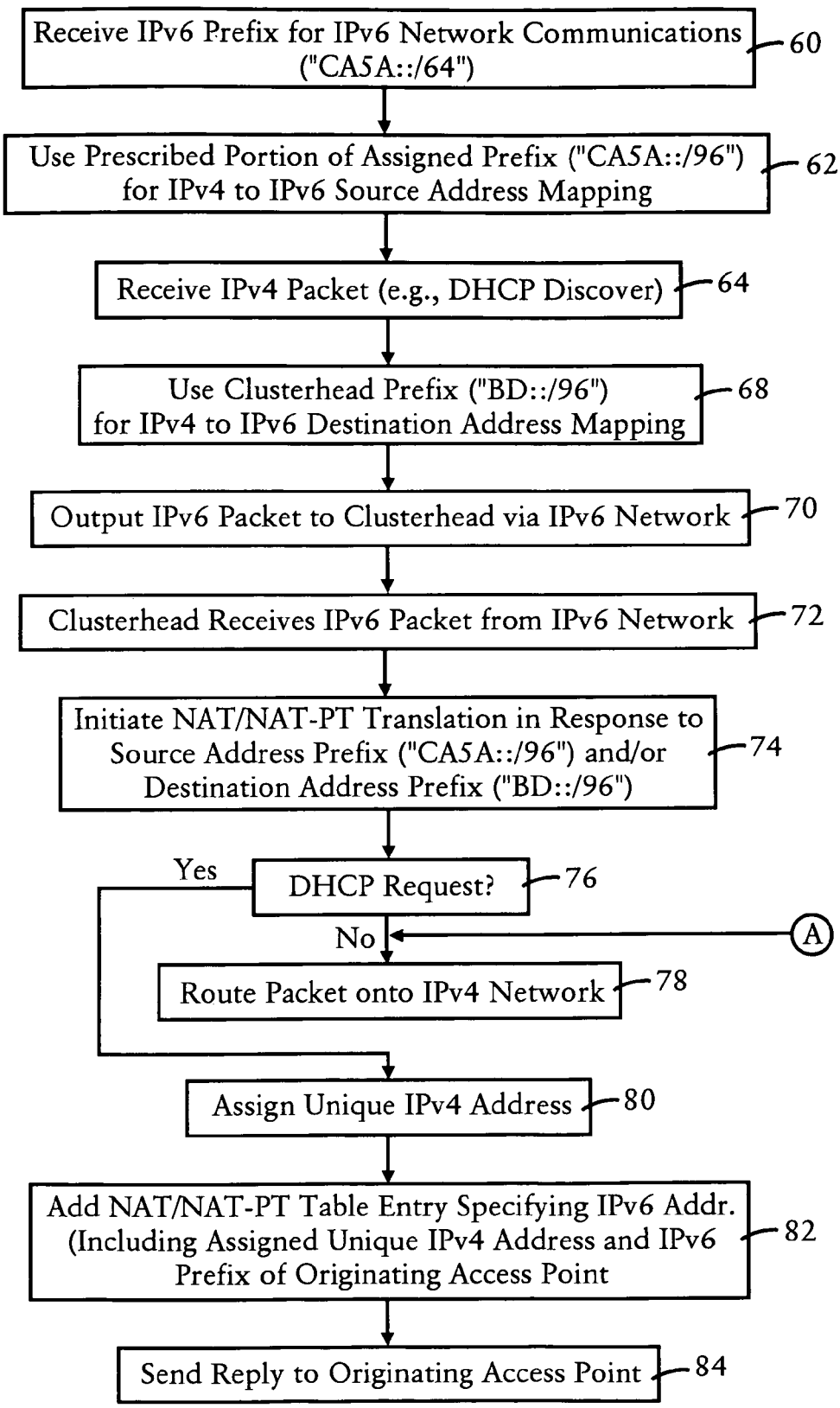
FIGS. 3A, 3B, and 3C, are flow diagrams summarizing the method of transmitting IPv4 packets between the IPv4 hosts and the IPv4 public network via the IPv6 network using an access point and the clusterhead, according to an embodiment of the present invention.
Figure 3B:
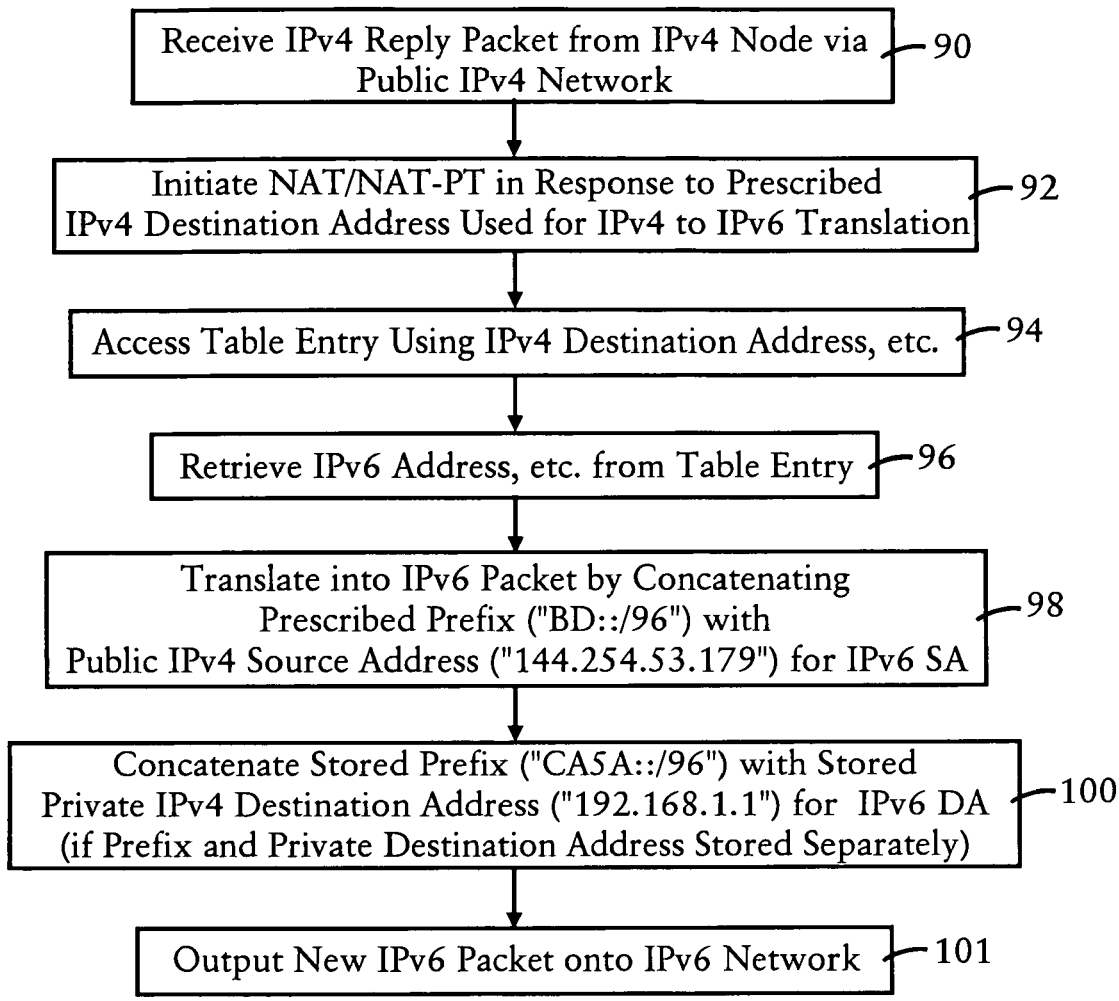
Figure 3C:
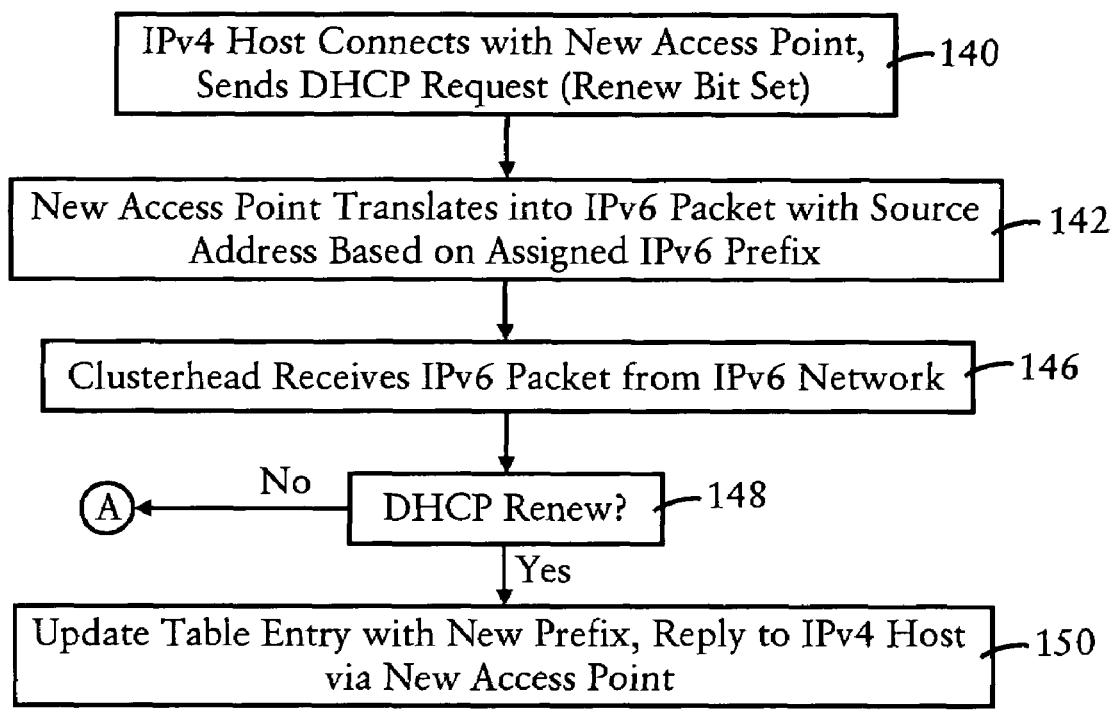

FIGS. 3A, 3B, and 3C, are flow diagrams summarizing the method of transmitting IPv4 packets between the IPv4 hosts 18 the IPv4 public network via the IPv6 network, according to an embodiment of the present invention. The steps described below with respect to FIGS. 3A, 3B, and 3C, can be implemented in the access points 30 and the clusterhead 32 as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

Referring to FIG. 3A, the access point 30 is initially configured by receiving in step 60 an assigned IPv6 prefix 34 to be used for communications in the IPv6 access network 14, for example according to DHCPv6 protocol. The translation resource 42 in step 62 selects a prescribed portion of the assigned prefix (e.g., "CA5A::/96") for IPv4 to IPv6 source address mapping.

Assume in step 64 that the access point 30 receives an IPv4 packet from an IPv4 host 18, for example a DHCP request in the form of a DHCP discovery message. The translator 42 in the access point 30 uses in step 68 a prescribed portion of the clusterhead prefix 38 ("BD::/96") for IPv4 to IPv6 destination address mapping. As apparent from the foregoing, use of a 96-bit prefix 38 enables the translation resource 42 to generate a valid IPv6 address merely by concatenating the address prefix 38 with a received 32-bit IPv4 address 20. Specifically, the translator resource 42 creates a new IPv6 header specifying new IPv6 source address 106 and a new IPv6 destination address 108. The new IPv6 source address ("CA5A::192.168.1.10") 106 is generated based on the translator 42 concatenating the prescribed address prefix ("CA5A: :/96") with the private IPv4 source address ("192.168.1.10") 20; the new IPv6 destination address ("BD::144.254.53.179") is generated based on the translator 42 concatenating the prescribed address prefix of the remote gateway prefix ("BD::/96") 38 with the public IPv4 destination address ("144.254.53.179") 24. If desired, the translator 42 also may add IPv6 option headers related to the layer 4 TCP/UDP source and destination ports, as described in detail in RFC 2460.

The IPv6 interface 44 of the access point 30 outputs in step 70 the newly-created IPv6 packet 104 for delivery to the clusterhead 32 via the IPv6 access network 14.

The IPv6 interface 44 of the clusterhead 32 receives in step 72 the IPv6 packet (e.g., 104) from the IPv6 access network 14. The translation resource 50 initiates in step 74 the NAT/NAT-PT translation, for example in response to identifying the source address prefix 34 identifies a access point 30 having performed IPv4 to IPv6 translation, and/or based on identifying the destination address prefix 38 to be used for IPv6 to IPv4 translation services.

The DHCP server 55 determines in step 76 whether the recovered IPv4 packet is a DHCP request. If the packet is not a DHCP request (e.g., an initial request, or a DHCP renew), the translation resource 50 completes translation in step 78 by inserting its assigned IPv4 address ("66.168.123.154") 112 into the source address field, resulting in the IPv4 packet 110 of FIG. 4A. If protocol translation is needed (e.g., TCP/UDP private-to-public translation), the translator 50 performs NAT-PT translation. Also, the ALG resource 52 parses the payload 102 to determine if address translation is needed within the payload 110, and performs address translation as necessary.

The translation resource 50 also stores the translation state information for the access point 30 by adding a table entry 56 that specifies at least the IPv6 source address 106 (including the local gateway prefix 34 and the IPv4 private address 20), and the IPv4 destination address 24. As described above, additional IPv4/IPv6/TCP/UDP information may be stored, depending on implementation. The IPv4 interface 40 of the clusterhead 32 outputs in step 78 the new IPv4 packet 110 for delivery to the destination IPv4 node ("D") 22 via the public IPv4 network 16.

Assuming in step 76 that the IPv4 packet includes a DHCP request, the DHCP server 55 assigns in step 80 a unique IPv4 address for the IPv4 host 18, and adds in step 82 a table entry 56 that specifies the IPv6 address 106 to be used while the IPv4 host is connected to the access point 30, including the unique IPv4 address 20 and the corresponding IPv6 address prefix 30 of the access point 30. A DHCP reply is sent in step 84 to the originating access point 30, in order to enable the IPv4 host 18 to begin use of the assigned IPv4 address.

FIG. 3B illustrates translation by the clusterhead 32 of the IPv4 packet 120, received from the public IPv4 node 22 via the public IPv4 network 16, into a new IPv6 packet 122 for transfer to the access point 30 via the IPv6 network 14. The IPv4 interface 40 of the clusterhead 32 receives in step 90 an IPv4 reply packet 120 from the IPv4 node 22 via the public network 16.

The translator 50, in response to detecting in step 92 the prescribed IPv4 destination address 112 assigned to the clusterhead 32, initiates NAT/NAT-PT translation by accessing in step 94 the table entry 56 using the IPv4 source address 24 and/or IPv4 destination address 112 as a key, as well as any other relevant address fields depending on implementation. The translator 50 retrieves in step 96 the stored IPv6 address 106 including the address prefix 34 of the access point 30, and the private IP address 20 of the IPv4 host 18. The translator 50 also retrieves any other necessary address information from the accessed table entry 56.

The translator 50 translates the IPv4 packet 120 into an IPv6 packet 122 in step 98 by concatenating its prescribed prefix ("BD::/96") 38 with the public IPv4 source address ("144.254.53.179") 24 to form the IPv6 source address ("BD::144.254.53.179") 108. If the prefix 34 and the private IPv4 address 20 are stored separately in the table entry 56, the translator 50 concatenates in step 100 the prefix 34 and the private IPv4 address 20 to form the IPv6 destination address 106 for the IPv6 packet 122. The clusterhead 32 outputs the IPv6 packet 122 in step 101 onto the IPv6 access network 14.

Hence, the clusterhead 32 constructs the IPv6 addresses in the packet 122 in a way that enables the access point 30 to extract the private IPv4 address 20 merely by truncating the corresponding address prefix 34 of the home gateway 30 in the destination address field of the IPv6 packet 122. If necessary, the translator 50 performs NAT-PT translation, and the ALG resource 52 translates any addresses in the payload 102'.

The IPv6 interface 44 of the clusterhead 32 outputs in step 101 the new IPv6 packet 122 onto the IPv6 access network 14 for delivery to the access point 30.

FIG. 3C is a diagram illustrating updating of the translation table 54 based on the IPv4 host establishing a connection with another access point 30. The IPv4 host 18d connects in step 140 with the new access point ("GW3") 30, and in response sends a DHCP request (having the renew bit set) in order to renew the assigned IPv4 address (e.g., "192.168.1.12"). The translation resource 42 in the new access point 30 translates in step 142 the DHCP request into an IPv6 packet having an IPv6 source address ("CA5C::192.168.1.12") based on the assigned IPv4 address specified in the source address of the IPv4 request ("192.168.1.12"), and the assigned IPv6 address prefix ("CA5C::/64"), and outputs an IPv6 packet specifying the new IPv6 source address and the encapsulated IPv4 DHCP request.

The clusterhead 32 receives in step 144 the IPv6 packet. In response to determining in step 148 that the received IPv6 packet includes a DHCP renew request, the DHCP server 55 updates in step 150 the table entry 56 with the new prefix to indicate that the IPv4 host 18d is now reachable via the new access point 30. The DHCP server 55 sends an acknowledgment back to the IPv4 host 18 via the new access point 30.

According to the disclosed embodiment, IPv4 packets can be transmitted across an IPv6 network, without the necessity of generating an IPv6 tunnel. Hence, the disclosed embodiment is particularly beneficial for streaming technologies such as voice over IP and video streaming, where packet size tends to be relatively small.

Moreover, the disclosed embodiment enables IPv4 hosts to roam freely throughout the access network, without the necessity of employing mobile IP protocol within the IPv4 hosts. Hence, the IPv4 hosts 18 can enjoy the advantages of mobility throughout the access network 14 simply by performing link layer connections with the access points 30, and sending DHCP to renew messages in response to moving to a new cell 12.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a clusterhead of an IPv6 access network, the method including:

receiving from an IPv4 host, via one of a plurality of access points providing IPv4 access within the IPv6 access network, a Dynamic Host Configuration Protocol (DHCP) request for assignment of an IPv4 address, the DHCP request within a first IPv6 packet created by the one access point and the first IPv6 packet including an IPv6 address prefix assigned to the one access point and that uniquely identifies the one access point having forwarded the DHCP request;

responding by the clusterhead to the DHCP request by assigning to the IPv4 host an IPv4 address that is unique among the access points providing the IPv4 access within the IPv6 access network, including creating a table entry in the clusterhead specifying the IPv4 address is reachable via the IPv6 address prefix of the one access point, and sending a DHCP response to the one access point that specifies the IPv4 address for use by the IPv4 host, wherein any host sending a corresponding DHCP request via one of the access points receives a corresponding unique IPv4 address from the clusterhead; and providing a single access by the clusterhead for any hosts accessing the IPv6 access network via one of the access points, including the IPv4 host, to an IPv4 wide area network, including:

(1) receiving from the IPv4 wide area network an IPv4 packet destined for the IPv4 host and having a destination IPv4 address identifying the clusterhead and distinct from the IPv4 address assigned to the IPv4 host, (2) identifying, based on accessing the corresponding table entry in the clusterhead, that the IPv4 host is reachable at the IPv4 address of the IPv4 host via the IPv6 address prefix specified in the table entry, and (3) sending at least a portion of the IPv4 packet to the access point having the corresponding IPv6 address prefix specified in the table entry having been accessed, for delivery to the IPv4 host assigned the IPv4 address, including sending at least the portion of the IPv4 packet in a second IPv6 packet specifying a destination IPv6 address including the IPv6 address prefix specified in the table entry and the IPv4 address assigned to the IPv4 host.

2. The method of claim 1, further comprising:

receiving a second DHCP request from the IPv4 host via a second of the access points within the IPv6 access network; and responding by the clusterhead to the second DHCP request by updating the table entry specifying the IPv4 address to specify that the IPv4 address is reachable via the corresponding IPv6 address prefix of the second access point, and sending a second DHCP response to the second access point acknowledging the second DHCP request.

3. The method of claim 2, wherein the sending further includes inserting within the second IPv6 packet a source IPv6 address that includes an IPv6 address prefix used by the clusterhead and an IPv4 source address from the IPv4 packet received from the IPv4 wide area network.

4. The method of claim 2, wherein:
the IPv4 address in the DHCP response is a private address and the destination IPv4 address in the IPv4 packet is a public address,
the identifying includes identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

5. The method of claim 1, wherein the sending further includes inserting within the second IPv6 packet a source IPv6 address that includes an IPv6 address prefix used by the clusterhead and an IPv4 source address from the IPv4 packet received from the IPv4 wide area network.

6. The method of claim 1, wherein:
the IPv4 address in the DHCP response is a private address and the destination IPv4 address in the IPv4 packet is a public address,
the identifying includes identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

7. The method of claim 1, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

8. A method in an IPv6 access network configured for providing connectivity between an IPv4 host and an IPv4 wide area network, the method comprising:
in at least one of a plurality of access points configured for providing IPv4 access within the IPv6 access network:
(1) receiving from an IPv4 host a Dynamic Host Configuration Protocol (DHCP) request for assignment of an IPv4 address, and
(2) forwarding the DHCP request by the one access point in a first IPv6 packet to a clusterhead in the IPv6 access network, including inserting into the first IPv6 packet a header having a source address field that includes an IPv6 address prefix assigned to the one access point and that uniquely identifies the one access point, and forwarding the first IPv6 packet to the clusterhead via the IPv6 access network;
in the clusterhead within the IPv6 access network:
(1) responding to the DHCP request in the first IPv6 packet by assigning to the IPv4 host an IPv4 address that is unique among the access points providing the IPv4 access within the IPv6 access network, including creating a table entry in the clusterhead specifying the IPv4 address is reachable via the IPv6 address prefix assigned to the one access point, and sending a DHCP response to the one access point that specifies the IPv4 address for use by the IPv4 host, wherein any host sending a corresponding DHCP request via one of the access points receives a corresponding unique IPv4 address from the clusterhead; and
(2) providing a single access by the clusterhead for any hosts accessing the IPv6 access network via one of the access points, including the IPv4 host, to an IPv4 wide area network, including:
(a) receiving from the IPv4 wide area network an IPv4 packet destined for the IPv4 host and having a destination IPv4 address identifying the clusterhead and distinct from the IPv4 address assigned to the IPv4 host,
(b) identifying, based on accessing the corresponding table entry in the clusterhead, that the IPv4 host is reachable at the IPv4 address of the IPv4 host via the IPv6 address prefix specified in the table entry, and
(c) sending at least a portion of the IPv4 packet to the access point having the corresponding IPv6 address prefix specified in the table entry having been accessed, for delivery to the IPv4 host assigned the IPv4 address, including sending at least the portion of the IPv4 packet in a second IPv6 packet specifying a destination IPv6 address including the IPv6 address prefix specified in the table entry and the IPv4 address assigned to the IPv4 host.

9. The method of claim 8, further comprising:
in a second of the access points within the IPv6 access network and having a corresponding IPv6 address prefix that uniquely identifies the second access point:
(1) receiving, a second DHCP request from the IPv4 host, and
(2) forwarding the second DHCP request in a third IPv6 packet to the clusterhead, including inserting into the third IPv6 packet a second header having a source address field that includes the corresponding IPv6 address prefix, and forwarding the third IPv6 packet to the clusterhead; in the clusterhead:
(4) responding to the second DHCP request by updating the table entry specifying the IPv4 address to specify that the IPv4 address is reachable via the IPv6 address prefix of the second access point, and sending a second DHCP response to the second access point acknowledging the second DHCP request;
the second access point sending the second DHCP response to the IPv4 host for continued use of the IPv4 address by the IPv4 host.

10. The method of claim 9, wherein the sending further includes inserting within the second IPv6 packet a source IPv6 address that includes an IPv6 address prefix used by the clusterhead and an IPv4 source address from the IPv4 packet received from the IPv4 wide area network.

11. The method of claim 9, wherein:
the IPv4 address in the DHCP response is a private address and the destination IPv4 address in the IPv4 packet is a public address,
the identifying includes identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

12. The method of claim 8, wherein the sending further includes inserting within the second IPv6 packet a source IPv6 address that includes an IPv6 address prefix used by the clusterhead and an IPv4 source address from the IPv4 packet received from the IPv4 wide area network.

13. The method of claim 8, wherein:
the IPv4 address in the DHCP response is a private address and the destination address in the IPv4 packet is a public address,
the identifying includes identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

14. The method of claim 8, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

15. A clusterhead for an IPv6 access network, the clusterhead comprising:
an IP-based access network interface configured for receiving from an IPv4 host, via one of a plurality of access points configured for providing IPv4 access within the IPv6 access network, a Dynamic Host Configuration Protocol (DHCP) request for assignment of an IPv4 address, the DHCP request within a first IPv6 packet created by the one access point and the first IPv6 packet including an IPv6 address prefix assigned to the one access point and that uniquely identifies the one access point having forwarded the DHCP request;
a DHCP resource configured for responding to the DHCP request by assigning to the IPv4 host an IPv4 address that is unique among the access points providing the IPv4 access within the IPv6 access network, the DHCP resource configured for creating a table entry in the clusterhead specifying the IPv4 address is reachable via the IPv6 address prefix of the one access point, and sending a DHCP response to the one access point that specifies the IPv4 address for use by the IPv4 host, wherein any host sending a corresponding DHCP request via one of the access points receives a corresponding unique IPv4 address from the clusterhead;
an IP-based wide area network interface configured for providing single access by the clusterhead for any hosts accessing the IPv6 access network via one of the access points, including the IPv4 host, to an IPv4 wide area network, the IP-based wide area network interface configured for receiving from the IPv4 wide area network an IPv4 packet destined for the IPv4 host and having a destination IPv4 address identifying the clusterhead and distinct from the IPv4 address assigned to the IPv4 host; and
an address identification resource configured for identifying, based on accessing the corresponding table entry in the clusterhead, that the IPv4 host is reachable at the IPv4 address of the IPv4 host via the IPv6 address prefix specified in the table entry, the address identification resource configured for sending at least a portion of the IPv4 packet, via the IP-based access network interface, to the access point having the corresponding IPv6 address prefix specified in the table entry having been accessed, for delivery to the IPv4 host assigned the IPv4 address, the at least the portion of the IPv4 packet sent in a second IPv6 packet specifying a destination IPv6 address including the IPv6 address prefix specified in the table entry and the IPv4 address assigned to the IPv4 host.

16. The clusterhead of claim 15, wherein:
the IP-based access network interface is configured for receiving a second DHCP request from the IPv4 host via a second of the access points within the IPv6 access network;
the DHCP resource is configured for responding to the second DHCP request by updating the table entry specifying the IPv4 address to specify that the IPv4 address is reachable via the corresponding IPv6 address prefix of the second access point, and sending via the IP-based access network interface a second DHCP response to the second access point acknowledging the second DHCP request.

17. The clusterhead of claim 16, wherein the protocol translation resource further is configured for inserting within the second IPv6 packet a source IPv6 address that includes an IPv6 address prefix used by the clusterhead and an IPv4 source address from the IPv4 packet received from the IPv4 wide area network.

18. The clusterhead of claim 16, wherein:
the IPv4 address in the DHCP response is a private address and the destination IPv4 address in the IPv4 packet is a public address,
the address identification resource further includes an address translation resource configured for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

19. The clusterhead of claim 15, wherein the protocol translation resource further is configured for inserting within the second IPv6 packet a source IPv6 address that includes an IPv6 address prefix used by the clusterhead and an IPv4 source address from the IPv4 packet received from the IPv4 wide area network.

20. The clusterhead of claim 15, wherein:
the IPv4 address in the DHCP response is a private address and the destination IPv4 address in the IPv4 packet is a public address,
the address identification resource further includes an address translation resource configured for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

21. The clusterhead of claim 15, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

22. An IPv6 access network configured for providing connectivity between an IPv4 host and an IPv4 wide area network, the IPv6 access network comprising:
a plurality of IPv4 access points, each configured for providing IPv4 access within the IPv6 access network based on:
(1) receiving from a corresponding connected IPv4 host a Dynamic Host Configuration Protocol (DHCP) request for assignment of a corresponding IPv4 address, and
(2) forwarding the DHCP request by the corresponding access point in a corresponding first IPv6 packet to a prescribed destination in the IPv6 access network, including inserting into the first IPv6 packet a header having a source address field that includes an IPv6 address prefix assigned to the corresponding access point and that uniquely identifies the access point, and forwarding the first IPv6 packet to the prescribed destination; and a clusterhead configured for receiving the first IPv6 packets destined for the prescribed destination, the clusterhead including:

(1) a DHCP resource configured for responding to each DHCP request by assigning to the corresponding IPv4 host a corresponding IPv4 address that is unique among the access points providing the IPv4 access within the IPv6 access network, the DHCP resource configured for creating a corresponding table entry in the clusterhead specifying the corresponding IPv4 address is reachable via the IPv6 address prefix of the access point having sent the corresponding DHCP request, and sending a corresponding DHCP response to the access point having sent the corresponding DHCP request that specifies the IPv4 address for use by the IPv4 host, wherein any host that sends a corresponding DHCP request via one of the access points receives a corresponding unique IPv4 address from the clusterhead;

(2) an IP-based wide area network interface configured for providing a single access by the clusterhead for any hosts accessing the IPv6 access network via one of the access points, including the IPv4 host, to an IPv4 wide area network, the IP-based wide area network interface configured for receiving from the IPv4 wide area network an IPv4 packet having a destination IPv4 address identifying the clusterhead and distinct from the IPv4 address assigned to the IPv4 host, and (3) an address identification resource configured for identifying, based on accessing the corresponding table entry in the clusterhead, that the IPv4 host is reachable at the IPv4 address of the IPv4 host via the IPv6 address prefix specified in the table entry, the address identification resource configured for sending at least a portion of the IPv4 packet to the access point having the corresponding IPv6 address prefix specified in the table entry having been accessed, for delivery to the IPv4 host assigned the IPv4 address, the at least the portion of the IPv4 packet sent in a second IPv6 packet specifying a destination IPv6 address including the IPv6 address prefix specified in the table entry and the IPv4 address assigned to the IPv4 host.

23. The network of claim 22, wherein the DHCP resource, in response to a receiving a second DHCP request for one of the IPv4 hosts having been assigned a corresponding IPv4 address, is configured for updating the table entry specifying the IPv4 address of the one IPv4 host is reachable via a first IPv6 address prefix assigned to a first of the access points having forwarded a first DHCP request for the one IPv4 host, the table entry updated to specify that the corresponding IPv4 address is reachable via the corresponding IPv6 address prefix of the access point having forwarded the second DHCP request, for continued use of the IPv4 address by the IPv4 host.

24. The network of claim 23, wherein the protocol translation resource further is configured for inserting within the second IPv6 packet a source IPv6 address that includes an IPv6 address prefix used by the clusterhead and an IPv4 source address from the IPv4 packet received from the IPv4 wide area network.

25. The network of claim 23, wherein:
the IPv4 address in the DHCP response is a private address and the destination IPv4 address in the IPv4 packet is a public address,
the address identification resource further includes an address translation resource configured for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

26. The network of claim 22, wherein the protocol translation resource further is configured for inserting within the second IPv6 packet a source IPv6 address that includes an IPv6 address prefix used by the clusterhead and an IPv4 source address from the IPv4 packet received from the IPv4 wide area network.

27. The network of claim 22, wherein:
the IPv4 address in the DHCP response is a private address and the destination address in the IPv4 packet is a public address,
the address identification resource further includes an address translation resource configured for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

28. The IPv6 access network of claim 22, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

29. A clusterhead for an IPv6 access network, the clusterhead comprising:

means for receiving, via one of a plurality of access points providing IPv4 access within the IPv6 access network, a Dynamic Host Configuration Protocol (DHCP) request from an IPv4 host for assignment of an IPv4 address, the DHCP request within a first IPv6 packet created by the one access point and the first IPv6 packet including an IPv6 address prefix assigned to the one access point and that uniquely identifies the one access point having forwarded the DHCP request;

means for responding to the DHCP request by assigning to the IPv4 host an IPv4 address that is unique among the access points providing the IPv4 access within the IPv6 access network, the means for responding configured for creating a table entry in the clusterhead specifying the IPv4 address is reachable via the IPv6 address prefix of the one access point, and sending a DHCP response to the one access point that specifies the IPv4 address for use by the IPv4 host, wherein any host sending a corresponding DHCP request via one of the access points receives a corresponding unique IPv4 address from the clusterhead;

means for providing single access by the clusterhead for any hosts accessing the IPv6 access network via one of the access points, including the IPv4 host, to an IPv4 wide area network, the means for providing single access configured for receiving from the IPv4 wide area network an IPv4 packet destined for the IPv4 host and having a destination IPv4 address identifying the clusterhead and distinct from the IPv4 address assigned to the IPv4 host; and means for identifying, based on accessing the corresponding table entry in the clusterhead, that the IPv4 host is reachable at the IPv4 address of the IPv4 host via the IPv6 address prefix specified in the table entry, the means for identifying configured for sending at least a portion of the IPv4 packet, via the means for receiving, to the access point having the corresponding IPv6 address prefix specified in the table entry having been accessed, for delivery to the IPv4 host assigned the IPv4 address, the at least the portion of the IPv4 packet sent in a second IPv6 packet specifying a destination IPv6 address including the IPv6 address prefix specified in the table entry and the IPv4 address assigned to the IPv4 host.

30. The clusterhead of claim 29, wherein:
the means for receiving is configured for receiving a second DHCP request from the IPv4 host via a second of the access points within the IPv6 access network;
the means for responding configured for responding to the second DHCP request by updating the table entry specifying the IPv4 address to specify that the IPv4 address is reachable via the corresponding IPv6 address prefix of the second access point, and sending via the means for receiving a second DHCP response to the second access point acknowledging the second DHCP request.

31. The clusterhead of claim 30, wherein the protocol translation means further is configured for inserting within the second IPv6 packet a source IPv6 address that includes an IPv6 address prefix used by the clusterhead and an IPv4 source address from the IPv4 packet received from the IPv4 wide area network.

32. The clusterhead of claim 30, wherein:
the IPv4 address in the DHCP response is a private address and the destination IPv4 address in the IPv4 packet is a public address,
the means for identifying further includes an address translation means for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

33. The clusterhead of claim 29, wherein the protocol translation means further is configured for inserting within the second IPv6 packet a source IPv6 address that includes an IPv6 address prefix used by the clusterhead and an IPv4 source address from the IPv4 packet received from the IPv4 wide area network.

34. The clusterhead of claim 29, wherein:
the IPv4 address in the DHCP response is a private address and the destination IPv4 address in the IPv4 packet is a public address,
the means for identifying further includes an address translation means for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

35. The clusterhead of claim 29, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

36. An IPv6 access network configured for providing connectivity between an IPv4 host and an IPv4 wide area network, the IPv6 access network comprising:
a plurality of IPv6 access points, each configured for providing IPv4 access within the IPv6 access network based on:
(1) receiving from a corresponding connected IPv4 host a Dynamic Host Configuration Protocol (DHCP) request for assignment of a corresponding IPv4 address, and
(2) forwarding the DHCP request by the corresponding access point in a corresponding first IPv6 packet to a prescribed destination in the IPv6 access network, including inserting into the first IPv6 packet a header having a source address field that includes an IPv6 address prefix assigned to the corresponding access point and that uniquely identifies the access point, and forwarding the first IPv6 packet to the prescribed destination; and
a clusterhead configured for receiving the first IPv6 packets destined for the prescribed destination, the clusterhead including:
(1) means for responding to each DHCP request by assigning to the corresponding IPv4 host a corresponding IPv4 address that is unique among the access points providing the IPv4 access within the IPv6 access network, the means for responding configured for creating a corresponding table entry in the clusterhead specifying the corresponding IPv4 address is reachable via the IPv6 address prefix of the access point having sent the corresponding DHCP request, and sending a corresponding DHCP response to the access point having sent the corresponding DHCP request that specifies the IPv4 address for use by the IPv4 host, wherein any host that sends a corresponding DHCP request via one of the access points receives a corresponding unique IPv4 address from the clusterhead;
(2) means for providing a single access by the clusterhead for any hosts accessing the IPv6 access network via one of the access points, including the IPv4 host, to an IPv4 wide area network, the means for providing single access configured for receiving from the IPv4 wide area network an IPv4 packet having a destination IPv4 address identifying the clusterhead and distinct from the IPv4 address assigned to the IPv4 host, and
(3) means for identifying, based on accessing the corresponding table entry in the clusterhead, that the IPv4 host is reachable at the IPv4 address of the IPv4 host via the IPv6 address prefix specified in the table entry, the means for identifying configured for sending at least a portion of the IPv4 packet to the access point having the corresponding IPv6 address prefix specified in the table entry having been accessed, for delivery to the IPv4 host assigned the IPv4 address, the at least the portion of the IPv4 packet sent in a second IPv6 packet specifying a destination IPv6 address including the IPv6 address prefix specified in the table entry and the IPv4 address assigned to the IPv4 host.

37. The network of claim 36, wherein the means for responding, in response to a receiving a second DHCP request for one of the IPv4 hosts having been assigned a corresponding IPv4 address, is configured for updating the table entry specifying the IPv4 address of the one IPv4 host is reachable via a first IPv6 address prefix assigned to a first of the access points having forwarded a first DHCP request for the one IPv4 host, the table entry updated to specify that the corresponding IPv4 address is reachable via the corresponding IPv6 address prefix of the access point having forwarded the second DHCP request, for continued use of the IPv4 address by the IPv4 host.

38. The network of claim 37, wherein the protocol translation means further is configured for inserting within the second IPv6 packet a source IPv6 address that includes an IPv6 address prefix used by the clusterhead and an IPv4 source address from the IPv4 packet received from the IPv4 wide area network.

39. The network of claim 37, wherein:
the IPv4 address in the DHCP response is a private address and the destination IPv4 address in the IPv4 packet is a public address,
the means for identifying further includes address translation means for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

40. The network of claim 36, wherein the protocol translation means further is configured for inserting within the second IPv6 packet a source IPv6 address that includes an IPv6 address prefix used by the clusterhead and an IPv4 source address from the IPv4 packet received from the IPv4 wide area network.

41. The network of claim 36, wherein:
the IPv4 address in the DHCP response is a private address and the destination address in the IPv4 packet is a public address,
the means for identifying further includes address translation means for identifying the IPv4 host as the destination based on accessing a Network Address Translation (NAT) table entry specifying the public address assigned to the IPv4 host and the private address assigned to the IPv4 host; and
the IPv4 address specified in the destination IPv6 address is the private address.

42. The IPv6 access network of claim 36, wherein the second IPv6 packet is sent by the clusterhead without use of an IPv6 tunnel, the IPv4 address that is unique among the access points enabling the IPv4 host to roam among the access points without use of mobile IP protocol within the IPv4 host.

\* \* \* \* \*

UNITED STATES PATENT AND TRADEMARK OFFICE
CERTIFICATE OF CORRECTION

| | | |
|---|---|---|
| PATENT NO. | : 7,639,686 B2 | Page 1 of 1 |
| APPLICATION NO. | : 11/100400 | |
| DATED | : December 29, 2009 | |
| INVENTOR(S) | : Wetterwald et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 896 days.

Signed and Sealed this

Twenty-first Day of December, 2010

David J. Kappos
*Director of the United States Patent and Trademark Office*